United States Patent
Viswanathan

(10) Patent No.: US 10,872,435 B2
(45) Date of Patent: Dec. 22, 2020

(54) METHOD AND APPARATUS FOR ITERATIVELY ESTABLISHING OBJECT POSITION

(71) Applicant: HERE GLOBAL B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 137 days.

(21) Appl. No.: 16/165,087

(22) Filed: Oct. 19, 2018

(65) Prior Publication Data
US 2020/0126251 A1  Apr. 23, 2020

(51) Int. Cl.
| | |
|---|---|
| *G06T 7/73* | (2017.01) |
| *G05D 1/02* | (2020.01) |
| *G06K 9/00* | (2006.01) |
| *G06K 9/03* | (2006.01) |

(52) U.S. Cl.
CPC .............. *G06T 7/74* (2017.01); *G05D 1/0251* (2013.01); *G06K 9/00818* (2013.01); *G06K 9/03* (2013.01); *G05D 2201/0213* (2013.01); *G06T 2207/20212* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS 6,970,591 B1    11/2005   Lyons et al.
9,870,624 B1    1/2018    Narang et al.
(Continued)

FOREIGN PATENT DOCUMENTS

DE    102011111856 A1    2/2013
DE    10 2015 205869 A1   10/2016

OTHER PUBLICATIONS

Extended European Search Report for Application No. EP 192038123 dated Mar. 16, 2020, 9 pages.
(Continued)

*Primary Examiner* — Leon Viet Q Nguyen
(74) *Attorney, Agent, or Firm* — Alston & Bird LLP

(57) ABSTRACT

A method, apparatus and computer program product are provided for iteratively establishing an optimized position of a feature from a plurality of images of the feature. Methods may include: receiving sensor data from at least one image sensor; processing the plurality of images to detect features within each of the plurality of images; for every combination of two images including the first feature, determining an estimated first feature position based on a triangulated position; establishing a spread of estimated first feature positions for the plurality of combinations of two images; determining a best-fit line passing through the spread of estimated first feature positions; iteratively minimizing a perpendicular error projection of each estimated first feature position relative to the best-fit line to obtain a reduced spread of optimized estimated first feature positions; and establishing from the reduced spread of optimized estimated feature positions an optimized estimated first feature position.

20 Claims, 8 Drawing Sheets

(56) References Cited

U.S. PATENT DOCUMENTS

2008/0027591 A1* 1/2008 Lenser ................. G05D 1/0251
 701/2
2016/0189004 A1 6/2016 Anastassov et al.
2017/0076438 A1 3/2017 Kottenstette et al.
2017/0345161 A1 11/2017 Takatani et al.
2018/0188027 A1* 7/2018 Zhang ................. G06K 9/6212

OTHER PUBLICATIONS

Krishnan, A. et al., *Vision System for Identifying Road Signs Using Triangulation and Bundle Adjust*, Proceedings of the 12$^{th}$ International IEEE Conference on Intelligent Transportation Systems, (Oct. 2009) 36-41.

* cited by examiner

US 10,872,435 B2

METHOD AND APPARATUS FOR ITERATIVELY ESTABLISHING OBJECT POSITION

TECHNOLOGICAL FIELD

Example embodiments of the present invention relate generally to iteratively establishing an object position in three-dimensional space, and more particularly, to using spatio-temporal context of the output of a detector to project an object location into image space and iteratively refining the object location.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require manual or semi-automated analysis of large amounts of data, and therefore are not practical without quicker or less costly techniques.

Some current methods rely upon feature detection from image data to perform road terrain detection or environment feature detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in three-dimensional space due to inaccuracy during the detection stage.

BRIEF SUMMARY

Accordingly, a method, apparatus, and computer program product are provided for iteratively establishing an optimized position of a feature from a plurality of images of the feature. In a first example embodiment, an apparatus is provided including at least one processor and at least one memory including computer program code. The at least one memory and the computer program code may be configured to, with the at least one processor, cause the apparatus to: receive sensor data from at least one image sensor, where the sensor data includes a plurality of images, each image including sensor position data; process the plurality of images using a detection module to detect features within each of the plurality of images; parse the plurality of images for images including a first feature; for every combination of two images including the first feature, determine an estimated first feature position based on a triangulated position between the first feature in each of the two images and the sensor position data associated with each of the two images; establish a spread of estimated first feature positions for the plurality of combinations of two images; determine a best-fit line passing through the spread of estimated first feature positions; iteratively minimize a perpendicular error projection of each estimated first feature position relative to the best-fit line to obtain a reduced spread of optimized estimated first feature positions; establish from the reduced spread of optimized estimated first feature positions an optimized estimated first feature position; and position an image of the first feature within a map based on the established optimized estimated first feature position.

According to some embodiments, the apparatus may be caused to provide for autonomous control of a vehicle in response to the position of the image of the first feature within the map. The position data may include image sensor orientation with respect to the first feature. Causing the apparatus to determine an estimated feature position may include causing the apparatus to determine an estimated position of an anchor point of the first feature, where the anchor point of the first feature may be consistent across the images including the first feature. Causing the apparatus to determine an estimated first feature position based on a triangulated position between the first feature in each of the two images and the sensor position data associated with each of the two images may include causing the apparatus to determine an estimated anchor point position of the first feature based on a position of the anchor point in each of the two images and an orientation of the respective image sensor that captured each of the two images. The at least one image sensor may be associated with a vehicle traveling along a road segment, where the first feature may include a road sign along the road segment. The road sign may include information regarding travel restrictions along the road segment, where the apparatus may be caused to provide for autonomous control of the vehicle based, at least in part, on the information of the road sign.

Embodiments described herein may provide a computer program product including at least one non-transitory computer readable storage medium having computer executable program code instructions stored therein. The computer executable program code instructions may include program code instructions to: receive sensor data from at least one image sensor, where the sensor data may include a plurality of images, and each image includes sensor position data; process the plurality of images using a detection module to detect features within each of the plurality of images; parse the plurality of images for images including a first feature; for every combination of two images including the first feature, determine an estimated first feature position based on a triangulated position between the first feature in each of the two images and the sensor position data associated with each of the two images; establish a spread of estimated first feature positions for the plurality of combinations of two images; determine a best-fit line passing through the spread of estimated first feature positions; iteratively minimize a perpendicular error projection of each estimated first feature position relative to the best-fit line to obtain a reduced spread of optimized estimated first feature positions; establish from the reduced spread of optimized estimated first feature positions an optimized first feature position; and position an image of the first feature within a map based on the established optimized first feature position.

According to some embodiments, the computer program product may include program code instructions to provide for autonomous control of a vehicle in response to the position of the image of the first feature within the map. The position data may include image sensor orientation data with respect to the first feature. The program code instructions to determine an estimated feature position may include program code instructions to determine an estimated position of an anchor point of the first feature, where the anchor point of the first feature is consistent across the images including the first feature. The program code instructions to determine an estimated first feature position based on a triangulated position between the first feature in each of the two images and the sensor position data associated with each of the two images may include program code instructions to determine an estimated anchor point position of the first feature based on a position of the anchor point in each of the two images and an orientation of the respective image sensor that captured the two images. The at least one image sensor may be associated with a vehicle traveling along a road segment, where the first feature includes a road sign along the road segment. The road sign may include information restricting travel along the road segment, where the computer program product may include program code instructions to provide for autonomous control of the vehicle based, at least in part, on the information of the road sign.

Embodiments described herein may provide a method including: receiving sensor data from at least one image sensor, where the sensor data includes a plurality of images, and each image includes sensor position data; processing the plurality of images using a detection module to detect features within each of the plurality of images; parsing the plurality of images for images including a first feature; for every combination of two images including the first feature, determining an estimated first feature position based on a triangulated position between the first feature in each of the two images and the sensor position data associated with each of the two images; establishing a spread of estimated first feature positions for the plurality of combinations of two images; determining a best-fit line passing through the spread of estimated first feature positions; iteratively minimizing a perpendicular error projection of each estimated first feature position relative to the best-fit line to obtain a reduced spread of optimized estimated first feature positions; establishing from the reduced spread of optimized estimated feature positions an optimized estimated first feature position; and positioning an image of the first feature within a map based on the established optimized estimated first feature position.

According to some embodiments, methods may include providing for autonomous control of a vehicle in response to the position of the image of the first feature within the map. The position data may include image sensor orientation data with respect to the first feature. Determining an estimated feature position may include determining an estimated position of an anchor point of the first feature, where the anchor point of the first feature is consistent across the images including the first feature. Determining an estimated first feature position based on a triangulated position between the first feature in each of the two images and the sensor position data associated with each of the two images may include determining an estimated anchor point position of the first feature based on a position of the anchor point in each of the two images and an orientation of the respective image sensor that captured each of the two images. The at least one image sensor may be associated with a vehicle traveling along a road segment, where the first feature includes a road sign along the road segment including information regarding travel restrictions along the road segment, where the method may include providing for autonomous control of the vehicle based, at least in part, on the information of the road sign.

Embodiments described herein may provide an apparatus including: means for receiving sensor data from at least one image sensor, where the sensor data includes a plurality of images, and each image includes sensor position data; means for processing the plurality of images using a detection module to detect features within each of the plurality of images; means for parsing the plurality of images for images including a first feature; for every combination of two images including the first feature, means for determining an estimated first feature position based on a triangulated position between the first feature in each of the two images and the sensor position data associated with each of the two images; means for establishing a spread of estimated first feature positions for the plurality of combinations of two images; means for determining a best-fit line passing through the spread of estimated first feature positions; means for iteratively minimizing a perpendicular error projection of each estimated first feature position relative to the best-fit line to obtain a reduced spread of optimized estimated first feature positions; means for establishing from the reduced spread of optimized estimated feature positions an optimized estimated first feature position; and means for positioning an image of the first feature within a map based on the established optimized estimated first feature position.

According to some embodiments, the apparatus may include means for providing for autonomous control of a vehicle in response to the position of the image of the first feature within the map. The position data may include image sensor orientation data with respect to the first feature. The means for determining an estimated feature position may include means for determining an estimated position of an anchor point of the first feature, where the anchor point of the first feature is consistent across the images including the first feature. The means for determining an estimated first feature position based on a triangulated position between the first feature in each of the two images and the sensor position data associated with each of the two images may include means for determining an estimated anchor point position of the first feature based on a position of the anchor point in each of the two images and an orientation of the respective image sensor that captured each of the two images. The at least one image sensor may be associated with a vehicle traveling along a road segment, where the first feature includes a road sign along the road segment including information regarding travel restrictions along the road segment, where the apparatus may include means for providing for autonomous control of the vehicle based, at least in part, on the information of the road sign.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
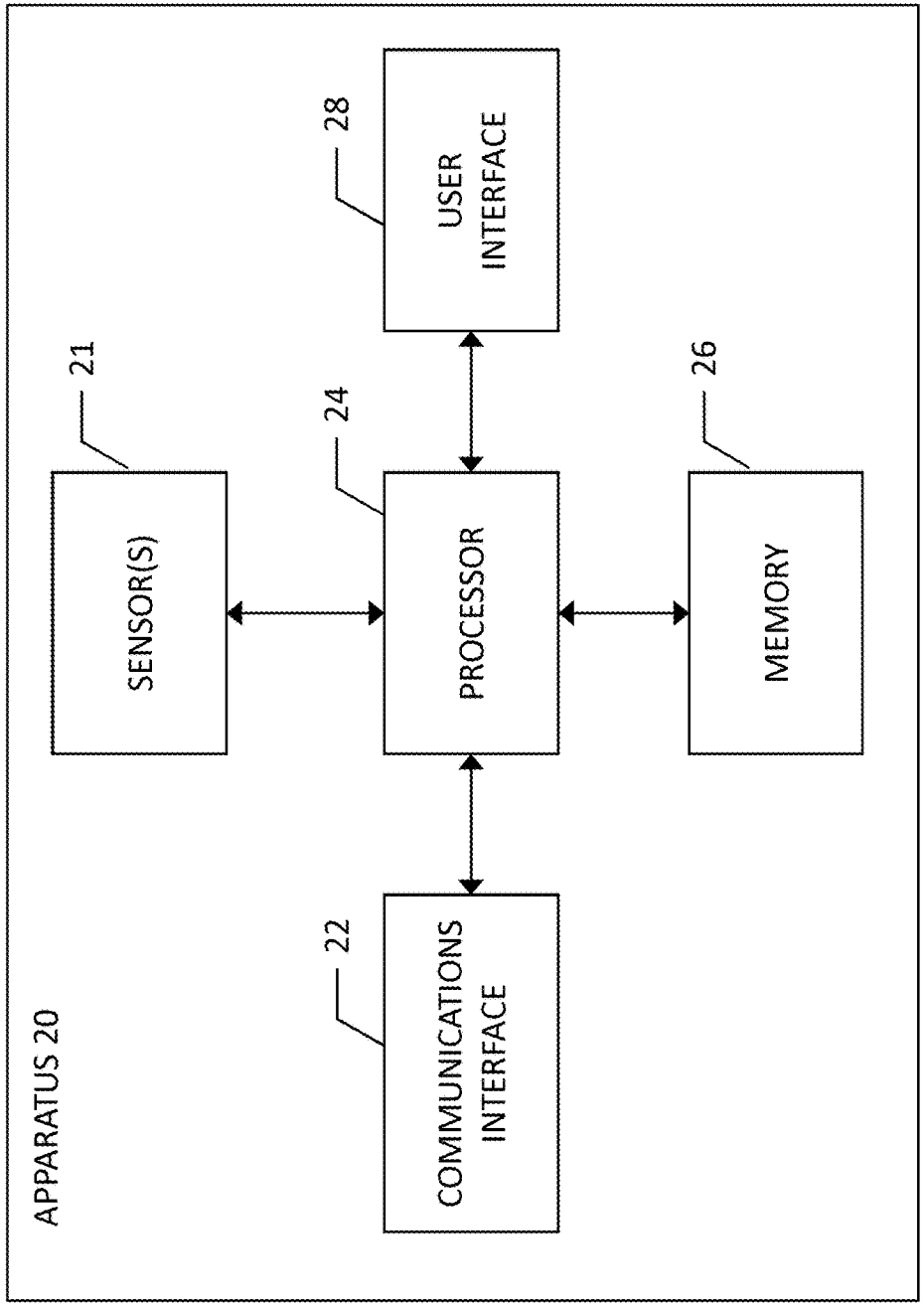
Figure 2:
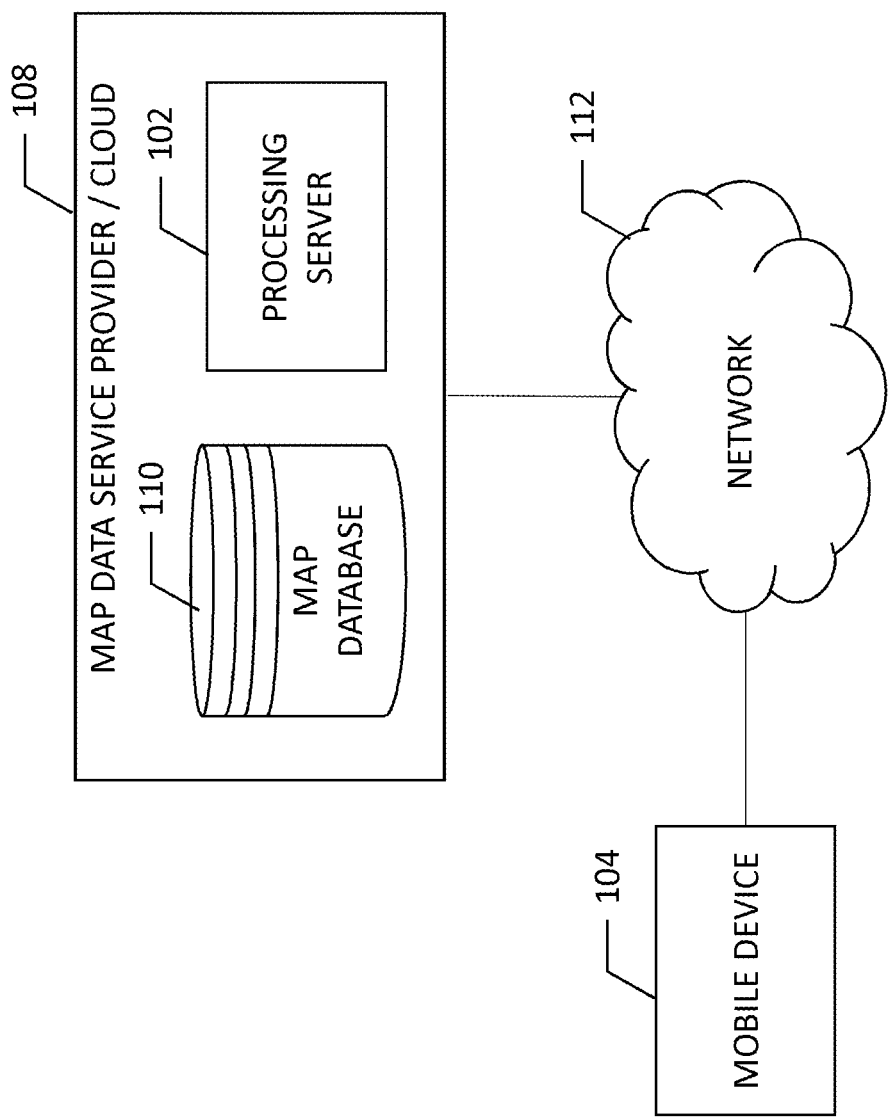
Figure 3:
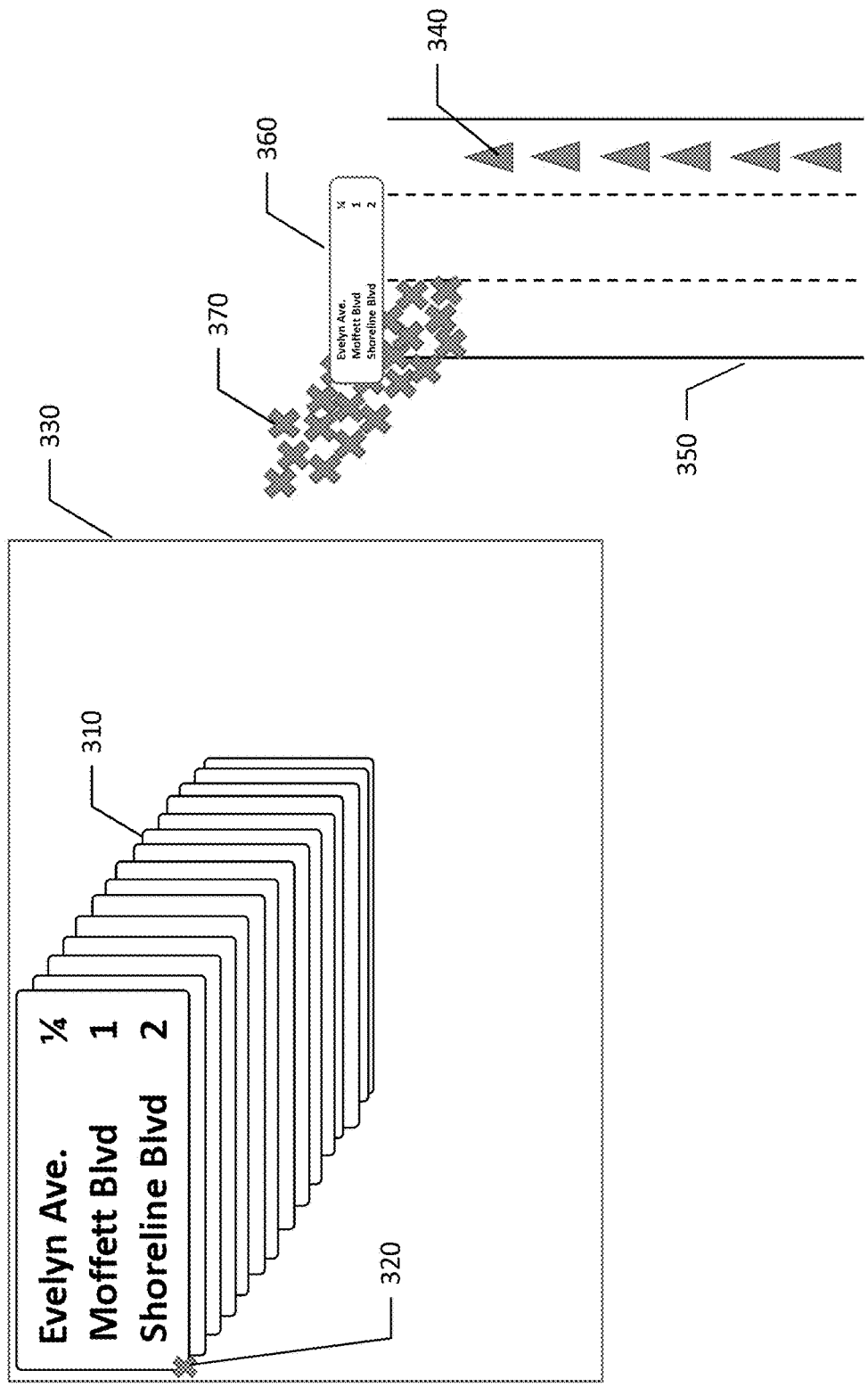
Figure 4:
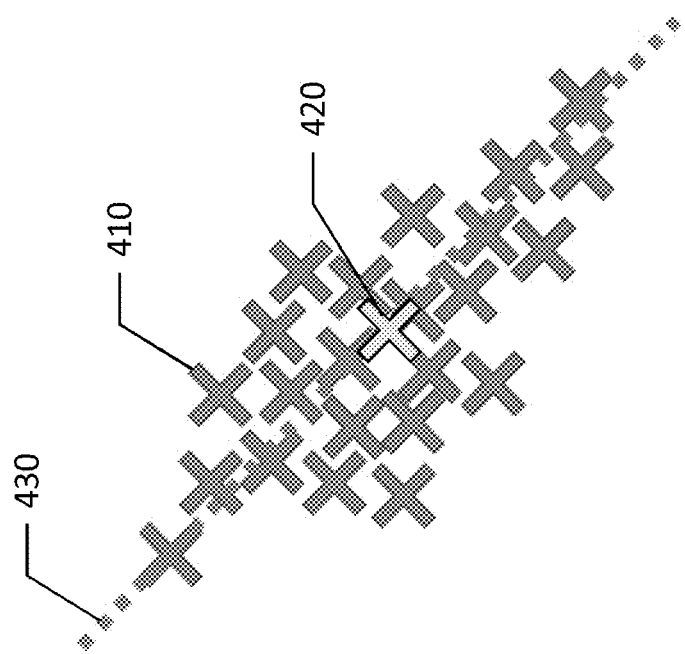
Figure 5:
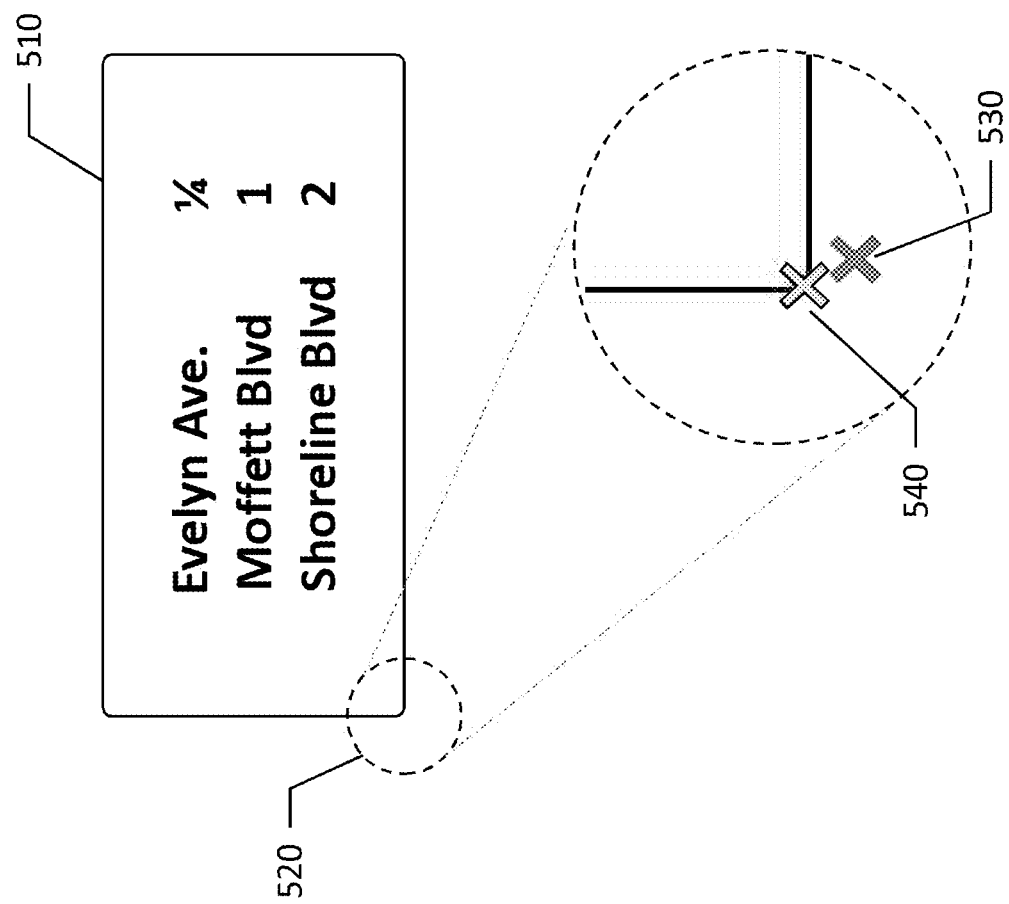
Figure 6:
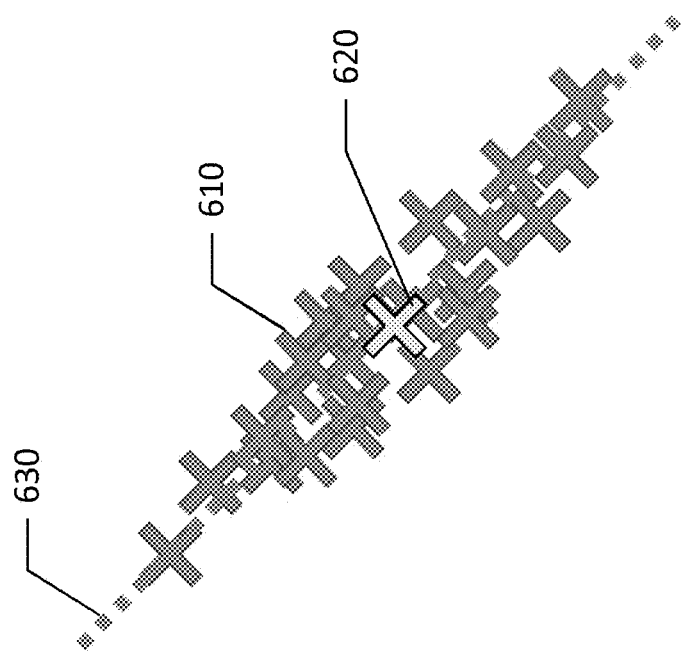
Figure 7:
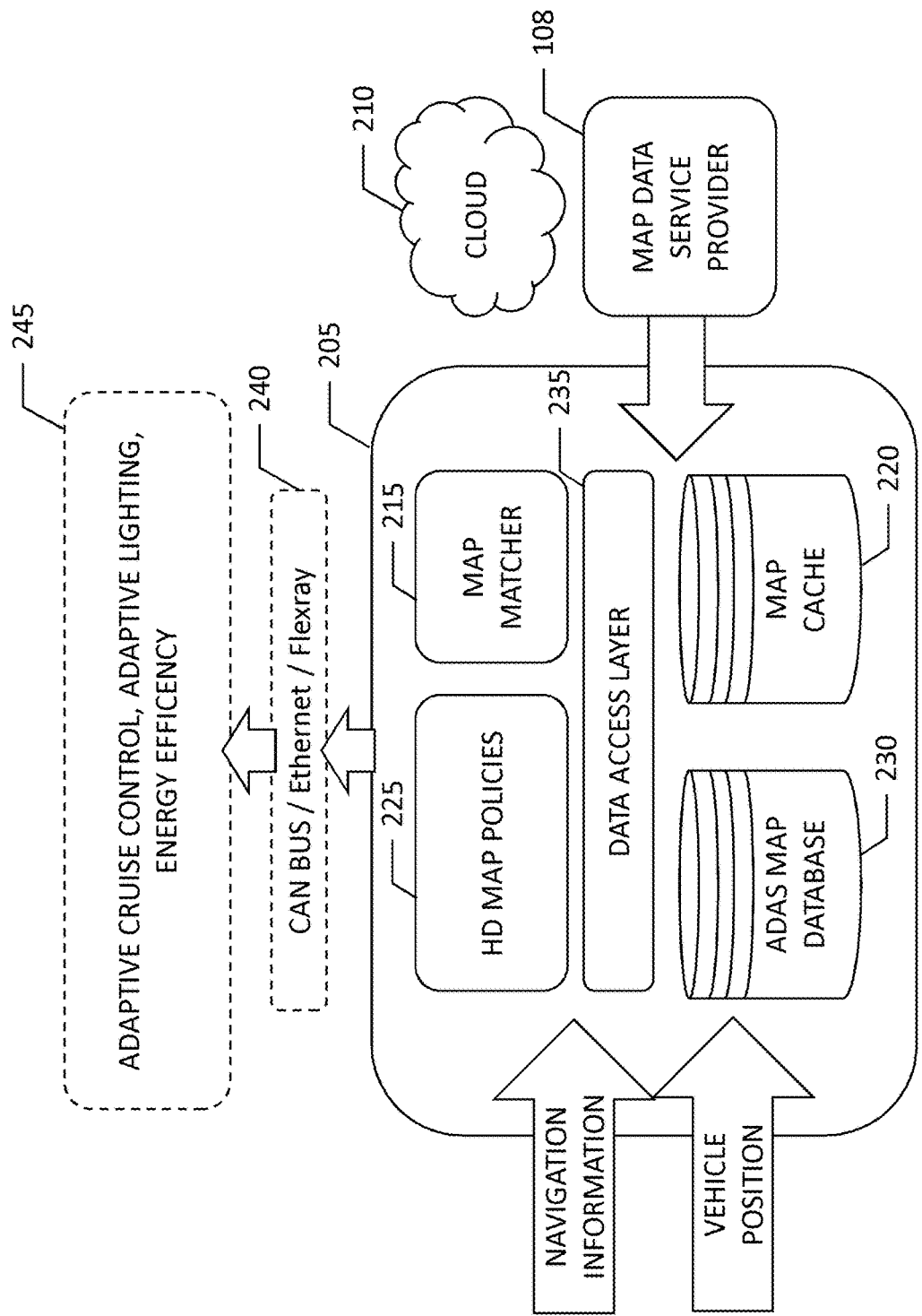
Figure 8:
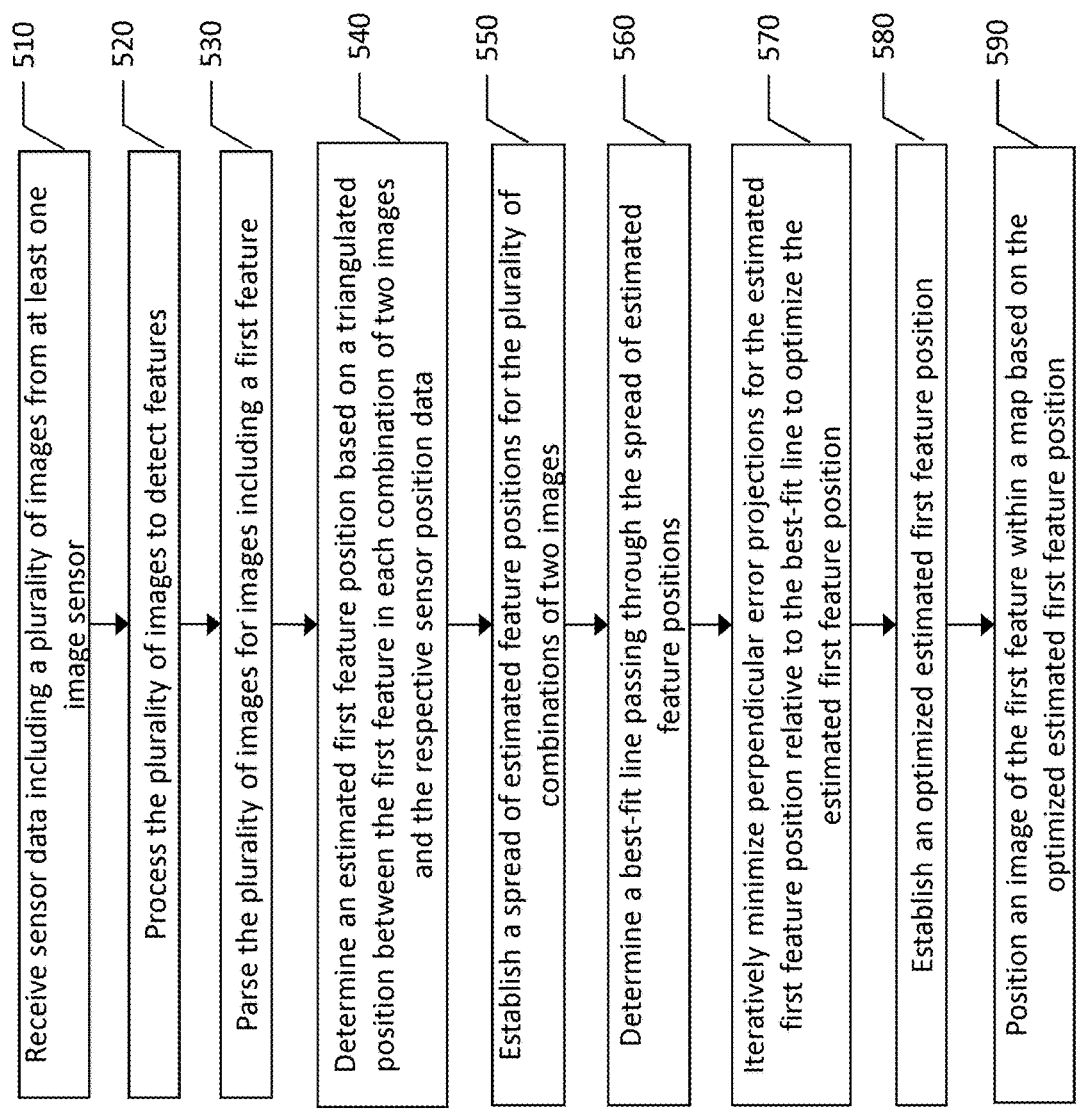

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for iteratively establishing the position of a detected object according to an example embodiment of the present disclosure;

FIG. 3 illustrates a frame including a plurality of features captured in images including the frame according to an example embodiment of the present disclosure;

FIG. 4 illustrates a plurality of estimated positions of an anchor point of a feature in a series of images from one or more image sensors according to an example embodiment of the present disclosure;

FIG. 5 illustrates an anchor point of a feature according to an example embodiment of the present disclosure;

FIG. 6 illustrates a plurality of optimized estimated positions of an anchor point of a feature in a series of images from one or more image sensors according to an example embodiment of the present disclosure;

FIG. 7 is a block diagram of a system for implementing the methods described herein for iteratively establishing an optimized position of a feature according to an example embodiment of the present disclosure; and FIG. 8 is a flowchart of operations for iteratively establishing an optimized position of a feature according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for iteratively establishing the position of a detected object. Autonomous vehicles leverage sensor information relating to roads and objects and features proximate the roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control and may be able to replicate road segments virtually with the inclusion of accurately placed signs and other features or objects proximate a roadway.

HD maps have a high precision at resolutions that may be down to several centimeters that identify objects proximate a road segment, such as features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment. According to some embodiments, vehicles may include multiple sensors and may seek to compare the data between the different sensors and/or sensor types to determine how closely they match. Determining how closely the image of a first sensor matches the image of a second sensor may be useful in a variety of ways to confirm sensor accuracy, to confirm map data, to measure sensor disparity, etc.

Embodiments described herein may broadly relate to computer vision when there is a need to establish the position of an object within an environment. For example, objects and features along a road segment may be detected through processing of sensor data. As the sensor data may be generated from a vehicle traveling along the road segment, the sensor data may not include object information from a perspective other than from along the road segment. As such, the degree to which sensor data may be relied upon for accurate positioning estimation of the object within three-dimensional space may be limited due to parallax effects between the relative sensor positions. Embodiments described herein provide a method of iteratively evaluating the position of a detected object along a road segment to more accurately establish the actual position of the object within the environment of the sensors detecting the object.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to road ways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, the ubiquity with which vehicles travel along road segments render those vehicles as opportunities to collect data related to the road segments provided the vehicles are equipped with some degree of sensor technology. A vehicle traveling along a road segment with only location sensing technology, such as a Global Positioning System, may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, road information/warning signs, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, such as may be caused by construction.

Further, in order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs). The vehicle context may be interpreted based on sensor observations that are passed through a perception module to understand the content of the observed environment. The perception module's set of detectors may correspond to deep-neural network based methods of understanding features in the environment and identifying a location of the features in the environment. Embodiments described herein include a method to improve the performance of detecting features and objects in an environment and properly locating them in the environment beyond conventional methods relying on human, manual labeling of objects.

Detecting objects and features of an environment may be difficult and may suffer from inherent bias based on the nature of the manual labeling efforts required to train such detectors. For example, a human labeler tasked with labelling objects in an image may manually mark the approximate corner of an observed sign in an image, while the true corner may be offset by a few pixels. Such errors, while they may be generally undiscernible from the context of a human observer, may manifest themselves as larger errors when such observed features are used to generate a map of the environment. Small errors in the detector may result in inaccurate reconstruction of the detector outputs when building the map. When detectors are accurate, the resulting map is accurate. This is critical in the context of HD map construction from crowd-sourced data. The detector quality from different vendors (e.g. map data vendors) may have high variability. Embodiments described herein use a technique that is vendor data agnostic and can be used to iteratively refine the detector quality.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. It may be difficult to accurately locate an object in three dimensional space based on a plurality of sensors detecting the object in three dimensional space from a single observation point as found in a single image of a sensed environment or inferring the object in three dimensional space from a single observation point when using a single sensor. Embodiments described herein provide an iterative technique to refine sensor data and detector output to provide more accurate estimations of object locations within three dimensional space. Embodiments may employ spatio-temporal context of the detector output to re-project triangulated points of the object into the image space to iteratively refine the point location. A maximum likelihood estimation process may then be used to refine the triangulated point location as well as the detected object points to refine the detector output.

Object detection using detectors that receive sensed data from a plurality of sensors may employ discrete-search techniques to approximate a point of an object, such as an object vertex or a corner of a sign to improve the determined location of the point of the detector's output. The directed search technique optimizes the magnitude of the local gradient, or other predetermined metrics as relevant to the feature-space, within a window of a fixed size, centered at the detector's output. The window size, if too small, may converge to the initial and likely inaccurate starting point. If the size is too large, other features on the object, such as text on a sign, may cause an incorrect final estimate of a point or corner of the object. The directed search approach described herein may operate on a single image and may not consider the context of the corner location, which can be estimated using a triangulation technique.

According to example embodiments described herein, sensor data is captured by sensors associated with one or more vehicles as they travel along a road segment. For a specific feature or object that is detected within sensed images, all images that have this feature may be considered to be part of a window of the detected feature. According to an example embodiment, the detected feature may be a road sign having a plane that is generally orthogonal to the road segment along which vehicles are traveling that detect the feature. Each pair of images having the detected feature therein may be used for triangulation of the feature using the camera pose relative to a fixed reference frame. This can be performed across all combinations of images containing the feature to produce a spread of triangulations that approximates the standard locus of errors in a parallelogram shape around the actual feature location.

FIG. 3 illustrates an example embodiment in which a plurality of images are captured in which a specific feature is detected. In the illustrated embodiment, the feature is sign 310, and while any or all of the corners of the sign may be identified as a locating point for the sign, according to the illustrated embodiment, the lower left corner 320 is the selected anchor point of the feature. The plurality of images captured that include the detected feature are depicted as the plurality of sign images in differing locations within the frame of the image 330. The differing locations of capture of the image are represented in part by the icons 340 representing one or more vehicles traveling along the road segment 350. As the one or more vehicles travel along the road segment 350, the relative location of the sign changes such that the position within the captured image frame 330 changes. The actual location of the sign along the road segment is illustrated at 360, while the plurality of detected anchor points as determined through triangulation are shown as the Xs 370 in FIG. 3.

As shown in FIG. 3, the precise location of the sign 360 is not discernable through individual images or even pairs of images in which the anchor point 320 of the sign is established in three-dimensional space through triangulation. As such, embodiments described herein determine a maximum likelihood of the actual position of the anchor point 320 of the sign 360 in three-dimensional space along the road segment 350.

To establish the estimated true-location of the triangulated feature, which in the example of FIG. 3 is the anchor point 320 of sign 360, a maximum likelihood estimator may be used. A maximum likelihood estimator may be embodied, for example, by a processor such as processor 24 configured specifically to perform an estimation of maximum likelihood. FIG. 4 illustrates an example embodiment of an initial set of triangulated feature points 410 that correspond to an anchor point of a detected object and an estimate 420 of the maximum likelihood of the true location of the anchor point is established. A best-fit line 430 is generated that passes through the estimated true-location of the anchor point as the best ray direction for the triangulated feature points. For each triangulated feature, the anchor point is slightly jittered and the perpendicular projection of the resulting triangulated point from the best ray direction is computed. The optimization function minimizes the perpendicular error projection across all of the triangulated points in an iterative manner. FIG. 5 illustrates an example embodiment of a captured image of a detected object (sign 510) where an anchor point of the detected object is the corner 520 of the sign. The raw detected corner is illustrated as cross 530, while the refined output after optimization is cross 540.

The resulting locus of errors shrinks since the location of the detector output is closer to the actual anchor point of the detected object. The optimized triangulated feature points 610 are shown in FIG. 6 with the best estimate shown at 620. The anchor point of the object is refined in the optimized image by optimizing to minimize the perpendicular projection of the triangulated feature to the line of sight vector 630. This results in a tighter grouping of the triangulated feature set around the line of sight vector 630 as shown in FIG. 6 in contrast to FIG. 4. The optimization function minimizes the perpendicular error projection across all the triangulated points in an iterative manner. The resulting locus of errors then shrinks since the location of the detector output is closer to the actual anchor point of the detected object. The newly refined anchor point, or sign corner in the illustrated embodiments, can then be used to fine-tune the detector, improving the overall performance of not just the perception systems, but also the accuracy of the resulting map of the environment.

Using the above-described techniques, an accurate location of an anchor point of a detected object can be obtained from a series of images through iterative refinement. This provides detailed information regarding the location of an object in three dimensional space for accurate reconstruction or representation of an object in an HD map. Further, embodiments described herein can identify and place objects within a three-dimensional space more reliably and accurately than methods including human, manual identification of anchor points. This results in a more efficient mechanism for processing sensor data from detectors and building or revising HD maps.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data. Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps. Further, properties of road segments may change at different times of day or different days of the week, such as express lanes which may be in a first direction of travel at a first time of day, and a second direction of travel at a second time of day. HD maps may include this information to provide accurate navigation and to facilitate autonomy along these road segments to supplement a sensor package associated with a vehicle.

According to example embodiments described herein, the role of HD maps in facilitating autonomous or semi-autonomous vehicle control may include crowd-sourced building of the maps to identify and confirm features of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to establish the position of features detected along a road segment accurately and repeatably.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 7 illustrates an example embodiment of architecture specifically configured for implementing embodiments described herein. The illustrated embodiment of FIG. 7 may be vehicle-based, where sensor data is obtained from sensors of a vehicle traveling along a road segment. The location of the collected sensor data along the road segment may be determined through location determination using GPS or other locationing means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment, such as the position of an object (e.g., a sign as described herein) relative to a vehicle and the road segment. A vehicle with autonomous or semi-autonomous control may detect features in the environment, such as information contained on a sign, to facilitate the autonomous or semi-autonomous control. Sensor redundancy may be used to provide additional confirmation relating to features and objects of the environment and to improve detection and reliability of vehicle interpretation of the surrounding environment.

FIG. 8 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 8 is a flowchart of a method for iteratively establishing a feature position within three-dimensional space. As shown, at 510 sensor data is received including a plurality of images from at least one image sensor. The plurality of images are processed at 520 using a detection module to detect features within each of the plurality of images. The plurality of images are parsed for those that include the first feature at 530. An estimated first feature position is determined at 540 based on a triangulated position between the first feature in each combination of two images and the respective sensor position data. A spread of estimated feature positions for the plurality of combinations of two images is established at 550. At 560, a best-fit line is calculated based on the spread of estimated feature positions. The error projections of the estimated first feature position are iteratively minimized at 770 relative to the best-fit line to optimize the estimated first feature position. An optimized estimated first feature position is established at 780, while an image of the first feature is positioned within a map based on the optimized estimated first feature position at 790.

In an example embodiment, an apparatus for performing the method of FIG. 8 above may comprise a processor (e.g., the processor 24) configured to perform some or each of the operations (510-590) described above. The processor may, for example, be configured to perform the operations (510-590) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-590 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive sensor data from at least one image sensor, wherein the sensor data comprises a plurality of images, and each image comprises sensor position data;

process the plurality of images using a detection module to detect features within each of the plurality of images;

parse the plurality of images for images including a first feature;

for each of a plurality of combinations of two images including the first feature, determine an estimated first feature position based on a triangulated position between the first feature in each of the two images and the sensor position data associated with each of the two images;

establish a spread of estimated first feature positions for the plurality of combinations of two images;

determine a best-fit line passing through the spread of estimated first feature positions;

iteratively reduce a perpendicular error projection of each estimated first feature position relative to the best-fit line to obtain a reduced spread of estimated first feature positions;

establish from the reduced spread of estimated first feature positions a resulting estimated first feature position; and position an image of the first feature within a map based on the established resulting estimated first feature position.

2. The apparatus of claim 1, wherein the apparatus is further caused to provide for autonomous control of a vehicle in response to the position of the image of the first feature within the map.

3. The apparatus of claim 1, wherein the position data comprises image sensor orientation data with respect to the first feature.

4. The apparatus of claim 1, wherein causing the apparatus to determine an estimated feature position comprises causing the apparatus to determine an estimated position of an anchor point of the first feature, wherein the anchor point of the first feature is consistent across the images including the first feature.

5. The apparatus of claim 4, wherein causing the apparatus to determine an estimated first feature position based on a triangulated position between the first feature in each of the two images and the sensor position data associated with each of the two images comprises causing the apparatus to determine an estimated anchor point position of the first feature based on a position of the anchor point in each of the two images and an orientation of the respective image sensor that captured each of the two images.

6. The apparatus of claim 1, wherein the at least one image sensor is associated with a vehicle traveling along a road segment, wherein the first feature comprises a road sign along the road segment.

7. The apparatus of claim 6, wherein the road sign comprises information regarding travel restrictions along the road segment, wherein the apparatus is further caused to provide for autonomous control of the vehicle based, at least in part, on the information of the road sign.

8. A computer program product comprising at least one non-transitory computer-readable storage medium having computer-executable program code instructions stored therein, the computer-executable program code instructions comprising program code instructions to:
receive sensor data from at least one image sensor, wherein the sensor data comprises a plurality of images, and each image comprises sensor position data;
process the plurality of images using a detection module to detect features within each of the plurality of images;
parse the plurality of images for images including a first feature;
for each of a plurality of combinations of two images including the first feature, determine an estimated first feature position based on a triangulated position between the first feature in each of the two images and the sensor position data associated with each of the two images;
establish a spread of estimated first feature positions for the plurality of combinations of two images;
determine a best-fit line passing through the spread of estimated first feature positions;
iteratively reduce a perpendicular error projection of each estimated first feature position relative to the best-fit line to obtain a reduced spread of estimated first feature positions;
establish from the reduced spread of estimated first feature positions a resulting estimated first feature position; and
position an image of the first feature within a map based on the established resulting estimated first feature position.

9. The computer program product of claim 8, further comprising program code instructions to provide for autonomous control of a vehicle in response to the position of the image of the first feature within the map.

10. The computer program product of claim 8, wherein the position data comprises image sensor orientation data with respect to the first feature.

11. The computer program product of claim 8, wherein the program code instructions to determine an estimated feature position comprise program code instructions to determine an estimated position of an anchor point of the first feature, wherein the anchor point of the first feature is consistent across the images including the first feature.

12. The computer program product of claim 11, wherein the program code instructions to determine an estimated first feature position based on a triangulated position between the first feature in each of the two images and the sensor position data associated with each of the two images comprise program code instructions to determine an estimated anchor point position of the first feature based on a position of the anchor point in each of the two images and an orientation of the respective image sensor that captured each of the two images.

13. The computer program product of claim 8, wherein the at least one image sensor is associated with a vehicle traveling along a road segment, wherein the first feature comprises a road sign along the road segment.

14. The computer program product of claim 13, wherein the road sign comprises information regarding travel restrictions along the road segment, wherein the computer program product further includes program code instructions to provide for autonomous control of the vehicle based, at least in part, on the information of the road sign.

15. A method comprising:
receiving sensor data from at least one image sensor, wherein the sensor data comprises a plurality of images, and each image comprises sensor position data;
processing the plurality of images using a detection module to detect features within each of the plurality of images;
parsing the plurality of images for images including a first feature;
for each of a plurality of combinations of two images including the first feature, determining an estimated first feature position based on a triangulated position between the first feature in each of the two images and the sensor position data associated with each of the two images;
establishing a spread of estimated first feature positions for the plurality of combinations of two images;
determine a best-fit line passing through the spread of estimated first feature positions;
iteratively reducing a perpendicular error projection of each estimated first feature position relative to the best-fit line to obtain a reduced spread of estimated first feature positions;
establishing from the reduced spread of optimized estimated first feature positions a resulting estimated first feature position; and
positioning an image of the first feature within a map based on the established resulting estimated first feature position.

16. The method of claim 15, further comprising providing for autonomous control of a vehicle in response to the position of the image of the first feature within the map.

17. The method of claim 15, wherein the position data comprises image sensor orientation data with respect to the first feature.

18. The method of claim 15, wherein determining an estimated feature position comprises determining an estimated position of an anchor point of the first feature, wherein the anchor point of the first feature is consistent across the images including the first feature.

19. The method of claim 18, wherein determining an estimated first feature position based on a triangulated position between the first feature in each of the two images and the sensor position data associated with each of the two images comprises determining an estimated anchor point position of the first feature based on a position of the anchor point in each of the two images and an orientation of the respective image sensor that captured each of the two images.

20. The method of claim 15, wherein the at least one image sensor is associated with a vehicle traveling along a road segment, wherein the first feature comprises a road sign along the road segment comprising information regarding travel restrictions along the road segment, wherein the method further comprises providing for autonomous control of the vehicle based, at least in part, on the information of the road sign.

* * * * *

UNITED STATES PATENT AND TRADEMARK OFFICE
CERTIFICATE OF CORRECTION

Page 1 of 1

PATENT NO. : 10,872,435 B2
APPLICATION NO. : 16/165087
DATED : December 22, 2020
INVENTOR(S) : Viswanathan It is certified that error appears in the above-identified patent and that said Letters Patent is hereby corrected as shown below:

In the Claims

Column 20, Claim 15, Line 53:
"establishing from the reduced spread of optimized estimated"
Should read:
--establishing from the reduced spread of estimated--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*